US011499568B2

(12) United States Patent
Kosaka et al.

(10) Patent No.: US 11,499,568 B2
(45) Date of Patent: Nov. 15, 2022

(54) CENTRIFUGAL FAN AND CENTRIFUGAL BLOWER

(71) Applicant: DENSO CORPORATION, Kariya (JP)

(72) Inventors: Sho Kosaka, Kariya (JP); Shuzo Oda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/323,065

(22) Filed: May 18, 2021

(65) Prior Publication Data

US 2021/0270287 A1 Sep. 2, 2021

Related U.S. Application Data

(63) Continuation of application No. PCT/JP2019/044713, filed on Nov. 14, 2019.

(30) Foreign Application Priority Data

Dec. 14, 2018 (JP) .............................. JP2018-234595

(51) Int. Cl.
*F04D 29/42* (2006.01)
*F04D 29/44* (2006.01)

(52) U.S. Cl.
CPC ....... *F04D 29/4226* (2013.01); *F04D 29/444* (2013.01)

(58) Field of Classification Search
None
See application file for complete search history.

(56) References Cited

U.S. PATENT DOCUMENTS

| 5,707,209 A * | 1/1998 | Iyer ........................ F04D 29/282 416/189 |
| 2003/0190230 A1 | 10/2003 | Ito |
| 2007/0217908 A1* | 9/2007 | Ochiai .................. F04D 29/282 415/206 |
| 2014/0023501 A1* | 1/2014 | Ikeda .................... F04D 29/281 416/189 |
| 2015/0043158 A1* | 2/2015 | Hirano ................ F04D 25/0606 361/679.48 |
| 2015/0043159 A1* | 2/2015 | Tamaoka ............ F04D 29/4226 361/679.48 |
| 2016/0355069 A1 | 12/2016 | Vincent |
| 2018/0100517 A1* | 4/2018 | Sawada ..................... A47L 9/00 |

(Continued)

FOREIGN PATENT DOCUMENTS

| EP | 3388684 A1 | 10/2018 |
| JP | 2003301794 A | 10/2003 |

(Continued)

*Primary Examiner* — Michael Lebentritt
(74) *Attorney, Agent, or Firm* — Harness, Dickey & Pierce, P.L.C.

(57) ABSTRACT

A centrifugal fan includes first blades and second blades connected via a separation plate. A side plate supports the first blades located on one side in an axial direction, and a main plate supports the second blades on the other side in the axial direction. The separation plate has an inner diameter larger than or equal to an outer diameter of the main plate and larger than or equal to a largest inner diameter of the second blade. The separation plate has an outer diameter smaller than or equal to an inner diameter of the side plate and smaller than or equal to a smallest outer diameter of the first blade.

6 Claims, 9 Drawing Sheets

(56) References Cited

U.S. PATENT DOCUMENTS

| | | | |
|---|---|---|---|
| 2019/0242396 A1* | 8/2019 | Ishii | F04D 25/0613 |
| 2019/0390676 A1* | 12/2019 | Ishii | F04D 29/4226 |
| 2022/0065263 A1* | 3/2022 | Kosaka | F04D 29/4213 |

FOREIGN PATENT DOCUMENTS

| | | |
|---|---|---|
| JP | 3843928 B2 | 11/2006 |
| JP | 3858744 B2 | 12/2006 |
| JP | 2008082230 A | 4/2008 |
| JP | 2010090835 A | 4/2010 |
| JP | 2017505397 A | 2/2017 |
| JP | 2017227213 A | 12/2017 |
| JP | 2017538886 A | 12/2017 |
| JP | 2018035791 A | 3/2018 |
| JP | 2018035792 A | 3/2018 |
| JP | 2018058472 A | 4/2018 |
| JP | 2018069860 A | 5/2018 |
| JP | 2018091274 A | 6/2018 |
| JP | 2018109383 A | 7/2018 |
| JP | 2018178830 A | 11/2018 |
| WO | WO-2017103358 A1 | 6/2017 |
| WO | WO-2018074339 A1 | 4/2018 |

* cited by examiner

CENTRIFUGAL FAN AND CENTRIFUGAL BLOWER

CROSS REFERENCE TO RELATED APPLICATIONS

The present application is a continuation application of International Patent Application No. PCT/JP2019/044713 filed on Nov. 14, 2019, which designated the U.S. and claims the benefit of priority from Japanese Patent Application No. 2018-234595 filed on Dec. 14, 2018. The entire disclosures of all of the above applications are incorporated herein by reference.

TECHNICAL FIELD

The present disclosure relates to a centrifugal fan and a centrifugal blower including the centrifugal fan.

BACKGROUND

A centrifugal blower is applied to an air conditioner for a vehicle. The centrifugal blower is capable of simultaneously sucking outside air and inside air from one side in the axial direction.

SUMMARY

A centrifugal fan is configured to draw in air from one side in an axial direction and blow out air outward in a radial direction. The centrifugal fan includes: a plurality of first blades arranged around a fan axis; a plurality of second blades arranged around the fan axis and located on the other side of the plurality of first blades in the axial direction; a side plate formed in a ring shape around the fan axis to support a part of the plurality of first blades located on the one side in the axial direction; a main plate that supports a part of the plurality of second blades located on the other side in the axial direction; and a separation plate connecting the plurality of first blades to the plurality of second blades to suppress mixing of air flowing through a first blade passage formed between the plurality of first blades and air flowing through a second blade passage formed between the plurality of second blades. The plurality of first blades and the plurality of second blades are connected to each other via the separation plate without a direct contact. A front edge portion of the plurality of first blades has a first front edge diameter which is a smallest inner diameter dimension. A rear edge portion of the plurality of first blades has a first rear edge diameter which is a smallest outer diameter dimension. A front edge portion of the plurality of second blades has a second front edge diameter which is a largest inner diameter dimension. A rear edge portion of the plurality of second blades has a second rear edge diameter which is a largest outer diameter dimension. The side plate has a side plate inner diameter which is a smallest inner diameter dimension. The main plate has a main plate outer diameter which is a largest outer diameter dimension. The separation plate has a separation plate inner diameter which is a smallest inner diameter dimension, and a separation plate outer diameter which is a largest outer diameter dimension. The front edge portion and the rear edge portion of the plurality of first blades have a diameter dimension on the other side in the axial direction that is smaller than or equal to a diameter dimension on the one side in the axial direction. The front edge portion and the rear edge portion of the plurality of second blades have a diameter dimension on the other side in the axial direction that is smaller than or equal to a diameter dimension on the one side in the axial direction. The separation plate inner diameter of the separation plate is larger than or equal to the main plate outer diameter, larger than or equal to the second front edge diameter, and smaller than or equal to the first front edge diameter. The separation plate outer diameter of the separation plate is smaller than or equal to the side plate inner diameter, larger than or equal to the second rear edge diameter, and smaller than or equal to the first rear edge diameter.

DESCRIPTION OF EMBODIMENTS

Figure 1:
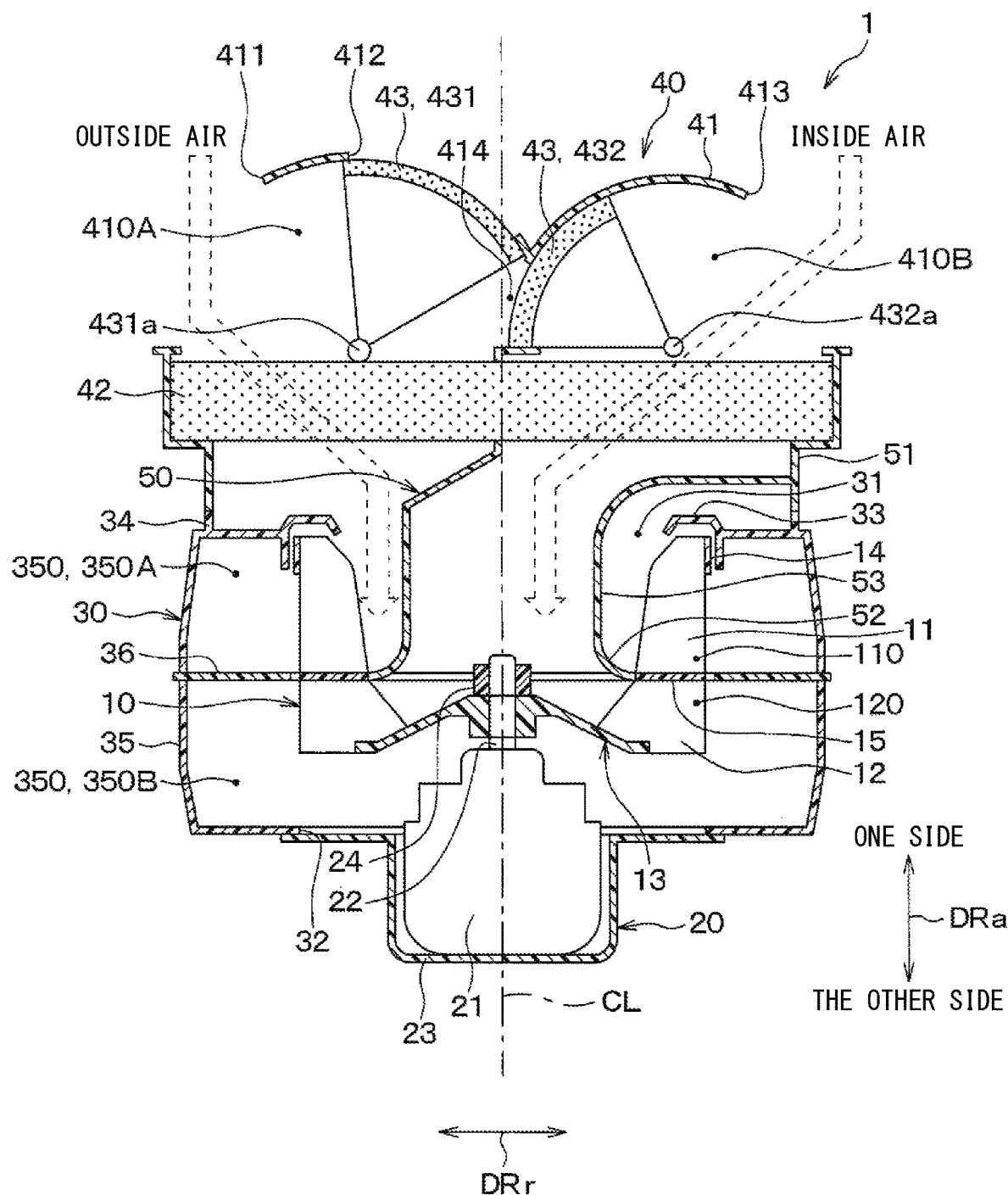
FIG. 1 is a schematic sectional view illustrating a centrifugal blower according to an embodiment.

To begin with, examples of relevant techniques will be described.

A centrifugal blower is applied to an air conditioner for a vehicle. The centrifugal blower is capable of simultaneously sucking outside air and inside air from one side of the fan axis in the axial direction.

The centrifugal blower has a centrifugal fan provided with a separation plate that separates the air blown from the centrifugal fan into a flow on one side in the axial direction and a flow on the other side in the axial direction. The centrifugal fan has a first fan located on one side in the axial direction with respect to the separation plate and a second fan located on the other side in the axial direction with respect to the separation plate.

The centrifugal fan is formed integrally of blades, a separation plate, and a fan boss, molded with resin. The separation plate and the fan boss do not wrap in the axial direction so that the die can be removed along the axial direction. The blades of the first fan and the blades of the second fan are directly connected, in some parts, without a separation plate.

If the blades of the first fan and the blades of the second fan are partially directly connected without a separation plate, the blades are limited in design. That is, if the blade of the first fan and the blade of the second fan are directly connected, they cannot be designed as independent blades.

As described above, the flexibility in designing the blade of the centrifugal fan is reduced while the centrifugal fan is excellent in manufacturability due to the integral molding so that the die can be removed along the axial direction.

The present disclosure provides a centrifugal fan having excellent manufacturability while ensuring the flexibility in designing the blade, and a centrifugal blower including the centrifugal fan.

According to one aspect of the present disclosure, a centrifugal fan is configured to draw in air from one side of a fan axis in an axial direction and blow out air outward in a radial direction.

According to another aspect of the present disclosure, a centrifugal blower includes a centrifugal fan, a fan casing that houses the centrifugal fan, and a separation cylinder arranged radially inside the centrifugal fan.

The centrifugal fan includes: a plurality of first blades arranged around the fan axis; a plurality of second blades arranged around the fan axis and located on the other side of the plurality of first blades in the axial direction; a side plate formed in a ring shape around the fan axis to support a part of the plurality of first blades located on the one side in the axial direction; a main plate that supports a part of the plurality of second blades located on the other side in the axial direction; and a separation plate connecting the plurality of first blades to the plurality of second blades to suppress mixing of air flowing through a first blade passage formed between the plurality of first blades and air flowing through a second blade passage formed between the plurality of second blades. The plurality of first blades and the plurality of second blades are connected to each other via the separation plate without a direct contact. A front edge portion of the plurality of first blades has a first front edge diameter which is a smallest inner diameter dimension. A rear edge portion of the plurality of first blades has a first rear edge diameter which is a smallest outer diameter dimension. A front edge portion of the plurality of second blades has a second front edge diameter which is a largest inner diameter dimension. A rear edge portion of the plurality of second blades has a second rear edge diameter which is a largest outer diameter dimension. The side plate has a side plate inner diameter which is a smallest inner diameter dimension. The main plate has a main plate outer diameter which is a largest outer diameter dimension. The separation plate has a separation plate inner diameter which is a smallest inner diameter dimension, and a separation plate outer diameter which is a largest outer diameter dimension. The front edge portion and the rear edge portion of the plurality of first blades have a diameter dimension on the other side in the axial direction that is smaller than or equal to a diameter dimension on the one side in the axial direction. The front edge portion and the rear edge portion of the plurality of second blades have a diameter dimension on the other side in the axial direction that is smaller than or equal to a diameter dimension on the one side in the axial direction. The separation plate inner diameter of the separation plate is larger than or equal to the main plate outer diameter, larger than or equal to the second front edge diameter, and smaller than or equal to the first front edge diameter. The separation plate outer diameter of the separation plate is smaller than or equal to the side plate inner diameter, larger than or equal to the second rear edge diameter, and smaller than or equal to the first rear edge diameter.

Accordingly, since the first blades and the second blades are connected via the separation plate without being in direct contact with each other, the first blade and the second blade can be designed as independent blades.

In addition, in the first blade and the second blade of the centrifugal fan, the diameter dimension of the front edge portion and the rear edge portion on the other side in the axial direction is smaller than the diameter dimension on the one side in the axial direction. Further, in the separation plate of the centrifugal fan, the inner diameter of the separation plate is larger than or equal to the outer diameter of the main plate, larger than or equal to the diameter of the second front edge portion, and smaller than or equal to the diameter of the first front edge portion. The outer diameter of the separation plate is smaller than or equal to the inner diameter of the side plate, larger than or equal to the diameter of the second rear edge portion, and smaller than or equal to the diameter of the first rear edge portion.

Accordingly, the centrifugal fan can be manufactured by integral molding by die-cutting in the axial direction, since there is no undercut part, when the centrifugal fan is formed by die-cutting in the axial direction.

Therefore, according to the present disclosure, it is possible to provide a centrifugal fan and a centrifugal blower having excellent manufacturability while ensuring the flexibility in designing each of the blades.

A reference symbol attached to each constituent element or the like shows an example of the correspondence of the constituent element or the like and a specific constituent element or the like described in an embodiment.

Hereinafter, an embodiment of the present disclosure will be described with reference to FIGS. 1 to 5. In the present embodiment, a centrifugal blower 1 is applied to a two-layer air conditioner for a vehicle, which can blow out air outside the cabin (hereinafter, referred to as outside air) and air inside the cabin (hereinafter, referred to as inside air) separately into the cabin.

The centrifugal blower 1 is arranged inside the instrument panel at the front of the cabin. As shown in FIG. 1, the centrifugal blower 1 includes a centrifugal fan 10, an electric motor 20, a fan casing 30, an inside/outside air switching unit 40, and a separation cylinder 50.

The centrifugal fan 10 blows out air sucked from one side in the axial direction DRa of the fan axis CL outward in the radial direction DRr. The centrifugal fan 10 is composed of a sirocco fan. The centrifugal fan 10 is not limited to the sirocco fan, and may be composed of a radial fan, a turbo fan, or the like.

The axial direction DRa is extended along the fan axis CL. The radial direction DRr is orthogonal to the fan axis CL and extends radially around the fan axis CL.

Figure 2:
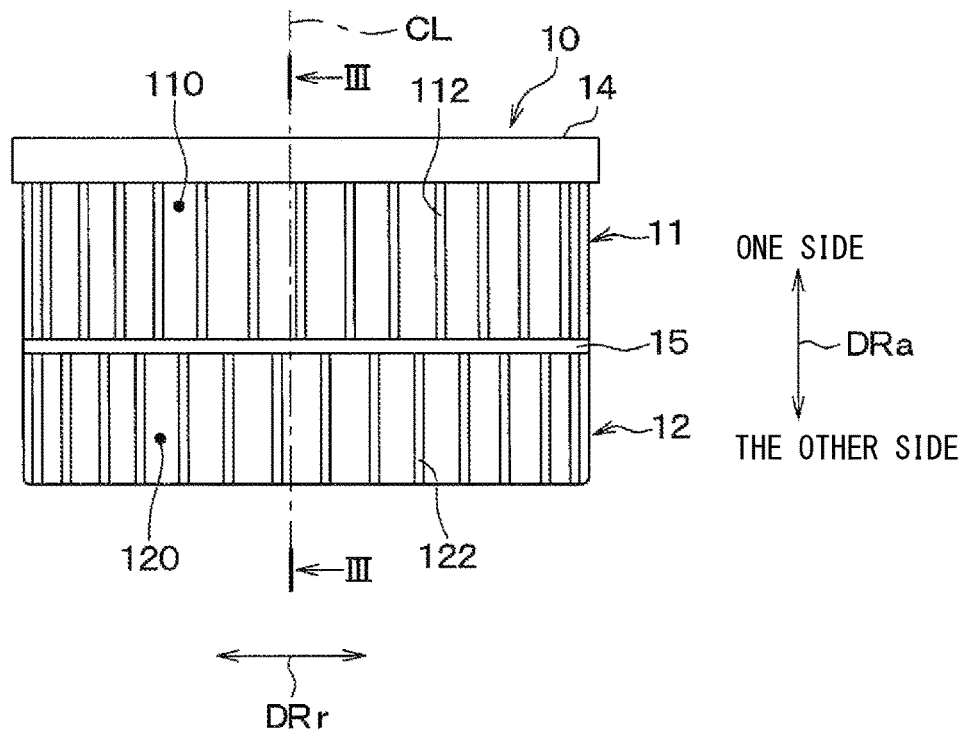
FIG. 2 is a schematic side view illustrating a centrifugal fan according to the embodiment.
Figure 3:
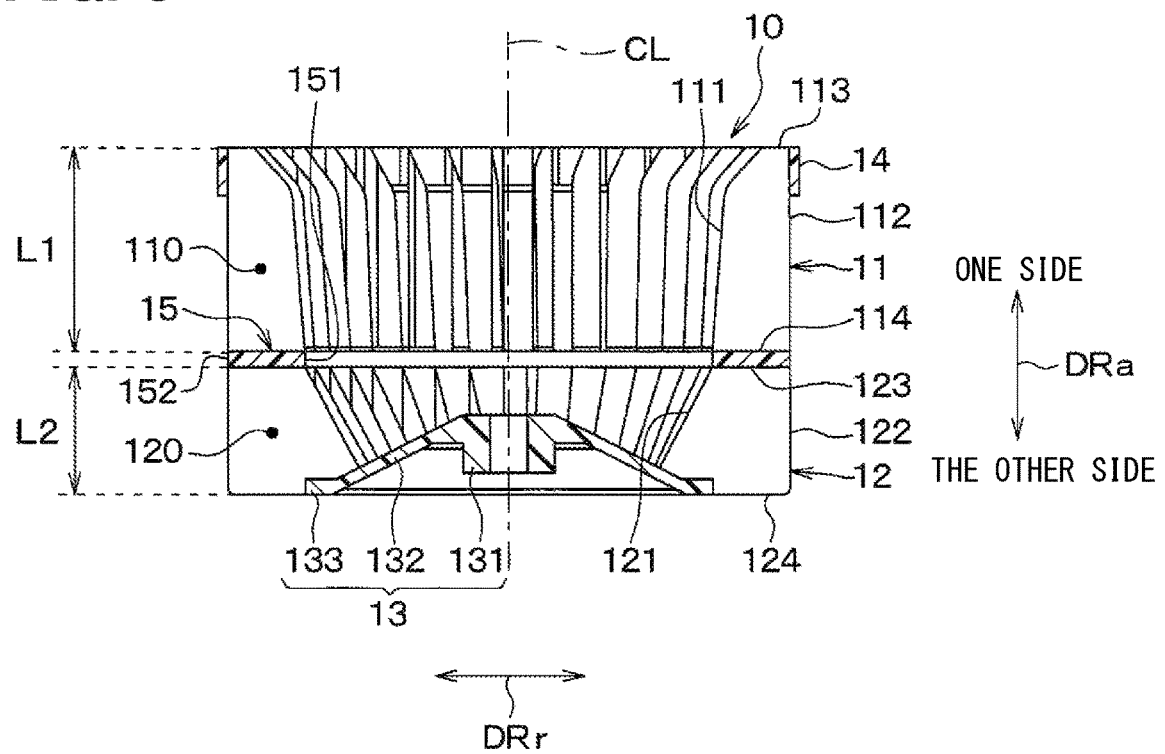
FIG. 3 is a cross-sectional view taken along a line III-III in FIG. 2.

As shown in FIGS. 2 and 3, the centrifugal fan 10 has plural first blades 11, a plural second blades 12, a main plate 13, a side plate 14, and a separation plate 15.

The first blades 11 are arranged around the fan axis CL. Each of the first blades 11 has a first front edge portion 111 located upwind with respect to the air flow, and a first rear edge portion 112 located leeward with respect to the air flow. Each of the first blades 11 has a first upper end portion 113 on one side in the axial direction DRa and a first lower end portion 114 on the other side in the axial direction DRa. A first blade passage 110 is formed between the first blades 11 for air.

The distance between the first front edge portion 111 and the fan axis CL is reduced from the one side to the other side in the axial direction DRa so that air can easily flow into the first blade passage 110 between the first blades 11. The first rear edge portion 112 of the first blade 11 extends along the axial direction DRa.

The second blades 12 are arranged around the fan axis CL. The second blades 12 are positioned on the other side of the first blades 11 in the axial direction DRa.

Each of the second blades 12 has a second front edge portion 121 located upwind with respect to the air flow and a second rear edge portion 122 located leeward with respect to the air flow. Each of the second blades 12 has a second upper end portion 123 on the one side in the axial direction DRa and a second lower end portion 124 on the other side in the axial direction DRa. A second blade passage 120 is formed between the second blades 12 for air.

The distance between the second front edge portion 121 and the fan axis CL is reduced from the one side to the other side in the axial direction DRa so that air can easily flow into the second blade passage 120 between the second blades 12. Specifically, the second front edge portion 121 extends linearly along a direction intersecting the axial direction DRa. The second rear edge portion 122 of the second blade 12 extends along the axial direction DRa.

The position of the second rear edge portion 122 of the second blade 12 is shifted with respect to the first rear edge portion 112 of the first blade 11 in the circumferential direction of the fan axis CL. In other words, the second blade 12 has the second rear edge portion 122 not to overlap the first rear edge portion 112 of the plural first blade 11 in the axial direction DRa. The second rear edge portion 122 is set at a position different from that of the first rear edge portion 112.

As a result, the first blade passage 110 and the second blade passage 120 are offset from each other in the circumferential direction of the fan axis CL. The first front edge portion 111 of the first blade 11 and the second rear edge portion 122 of the second blade 12 may be at the same position or set at different positions in the circumferential direction of the fan axis CL.

In the centrifugal fan 10 of the present embodiment, the axial length L2 from the second upper end portion 123 to the second lower end portion 124 of the second blade 12 is shorter than the axial length L1 from the first upper end portion 113 to the first lower end portion 114 of the first blade 11. In the centrifugal fan 10, the axial length L2 of the second blade 12 may be larger than or equal to the axial length L1 of the first blade 11.

As shown in FIG. 3, the main plate 13 is a disk-shaped member centered on the fan axis CL. The main plate 13 has a boss portion 131 at the center thereof, to which the rotating shaft 22 of the electric motor 20 is connected so as not to rotate relative to each other.

The main plate 13 has an inclined portion 132 connected to the boss portion 131 and inclined so as to intersect the fan axis CL, and a flat portion 133 connected to the inclined portion 132 and extended along the radial direction DRr.

The outer portion of the main plate 13 in the radial direction DRr is fixed to the second lower end portion 124 of the second blade 12. Specifically, a part of the inclined portion 132 and the flat portion 133 of the main plate 13 are fixed to the second lower end portions 124 of the second blades 12.

The side plate 14 reinforces the centrifugal fan 10. The side plate 14 is formed in a ring shape centered on the fan axis CL, and supports a part of the first blades 11 located on the one side in the axial direction DRa. Specifically, the inner surface of the side plate 14 in the radial direction DRr is fixed on the first rear edge portion 112 located on the one side of the first blade 11 in the axial direction DRa.

The separation plate 15 connects the first blades 11 and the second blades 12 with each other. The separation plate 15 suppresses the mixing of air flowing through the first blade passage 110 between the first blades 11 and air flowing through the second blade passage 120 between the second blades 12.

The separation plate 15 has a ring shape centered on the fan axis CL, and is composed of a plate-shaped member having a plate surface extended so as to be orthogonal to the fan axis CL. The separation plate 15 has an inner end surface 151 located at the inner end in the radial direction DRr and an outer end surface 152 located at the outer end in the radial direction DRr.

The first lower end portion 114 of the first blade 11 is fixed to the plate surface of the separation plate 15 on the one side in the axial direction DRa. The second upper end portion 123 of the second blade 12 is fixed to the plate surface of the separation plate 15 on the other side in the axial direction DRa. The first blades 11 and the second blades 12 are connected via the separation plate 15 without being in direct contact with each other. That is, the first lower end portion 114 of the first blade 11 is connected to the separation plate 15 without being in contact with the second upper end portion 123 of the second blade 12. The second upper end portion 123 of the second blade 12 is connected to the separation plate 15 without being in contact with the first lower end portion 114 of the first blade 11.

The centrifugal fan 10 is configured as an integrally molded product integrally having the plural first blades 11, the plural second blades 12, the main plate 13, the side plate 14, and the separation plate 15 integrally molded by a molding technique such as injection molding. The shape, dimensions, and the like of each component constituting the centrifugal fan 10 are appropriately set so that the centrifugal fan 10 can be integrally molded by die sliding in the axial direction DRa. This will be described later.

As shown in FIG. 1, the electric motor 20 is an electric drive device that rotates the centrifugal fan 10. The electric motor 20 has a main body 21 that generates power, a rotating shaft 22 that is rotated by the power of the main body 21, and a motor cover 23.

The rotating shaft 22 extends from the main body 21 toward the one side in the axial direction DRa. The rotating shaft 22 is fixed to the main plate 13 of the centrifugal fan 10 by the motor cap 24. As a result, when the rotating shaft 22 rotates, the centrifugal fan 10 rotates.

The motor cover 23 covers a portion of the main body 21 on the other side in the axial direction DRa. The motor cover 23 is fixed to the fan casing 30 while holding the main body 21.

The fan casing 30 is a housing that houses the centrifugal fan 10 inside. The fan casing 30 has a suction port 31 through which air sucked into the centrifugal fan 10 passes. The suction port 31 is located on the one side of the centrifugal fan 10 in the axial direction DRa. The fan casing 30 has a fan insertion hole 32 for inserting the centrifugal fan 10 at a position located on the other side of the centrifugal fan 10 in the axial direction DRa.

The fan casing 30 has a bell mouth 33, a mounting frame 34, a blowout passage forming portion 35, and a partition plate 36. The bell mouth 33 forms a peripheral portion of the suction port 31 in the fan casing 30. The bell mouth 33 is curved to have an arcuate shape in the cross-section so that air can flow smoothly through the suction port 31.

The mounting frame 34 is a rectangular frame for mounting the inside/outside air switching unit 40 and the separation cylinder 50 to the fan casing 30. The mounting frame 34 is provided at a portion of the fan casing 30 located on the one side of the centrifugal fan 10 in the axial direction DRa.

The blowout passage forming portion 35 forms a blowout air passage 350 through which the air blown from the centrifugal fan 10 outward of the centrifugal fan 10 in the radial direction DRr. The blowout air passage 350 is formed in a spiral shape around the centrifugal fan 10. That is, the fan casing 30 has the blowout air passage 350 formed in a spiral shape around the centrifugal fan 10. The fan casing 30 is also called a scroll casing. The fan casing 30 may be composed of a casing other than the scroll casing.

The partition plate 36 is arranged inside the blowout passage forming portion 35. The partition plate 36 is composed of a ring-shaped plate member centered on the fan axis CL. The partition plate 36 divides the blowout air passage 350 into a first blowout passage 350A on the one side in the axial direction DRa and a second blowout passage 350B on the other side in the axial direction DRa with respect to the first blowout passage 350A.

The outer portion of the partition plate 36 in the radial direction DRr is fixed to the inner wall of the blowout passage forming portion 35. The partition plate 36 is arranged so that the inner portion in the radial direction DRr faces the outer portion of the separation plate 15 in the radial direction DRr. As a result, the air from the first blade passage 110 of the centrifugal fan 10 flows into the first blowout passage 350A, and the air from the second blade passage 120 of the centrifugal fan 10 flows into the second blowout passage 350B.

Although not shown, an air conditioning unit is connected to the outlet of the blowout air passage 350. The air conditioning unit has a cooling heat exchanger and a heating heat exchanger that adjust the temperature of the air blown into the cabin, which are housed inside the air conditioning casing that forms the air passage. The air blown out from the fan casing 30 by the rotation of the centrifugal fan 10 is adjusted to have a desired temperature inside the air conditioning unit, and then blown out into the cabin.

The fan casing 30 is made of a resin (for example, polypropylene) having a certain degree of elasticity and excellent strength. The fan casing 30 is composed of an assembled body in which plural divided bodies are assembled due to reasons such as resin molding or assembly of built-in parts. The plural divided bodies are fastened by fastener such as screw or clip.

The inside/outside air switching unit 40 is attached to the mounting frame 34 in the fan casing 30 to selectively introduce air from inside and outside the vehicle. The inside/outside air switching unit 40 has an inside/outside air casing 41 that constitutes an outer shell.

The inside/outside air casing 41 is arranged on the one side of the fan casing 30 in the axial direction DRa. The inside/outside air casing 41 constitutes a suction casing that forms an air passage through which air introduced into the inside/outside air casing 41 and the suction port 31 passes. The inside/outside air casing 41 is made of resin (for example, polypropylene) having a certain degree of elasticity and excellent strength.

The inside/outside air casing 41 has an outside air introduction port 411 for introducing outside air, and a first inside air introduction port 412 and a second inside air introduction port 413 for introducing inside air. The outside air introduction port 411, the first inside air introduction port 412, and the second inside air introduction port 413 are arranged in a predetermined direction orthogonal to the fan axis CL.

The inside/outside air casing 41 includes a first introduction space 410A into which the outside air from the outside air introduction port 411 or the inside air from the first inside air introduction port 412 is introduced, and a second introduction space 410B into which the inside air from the second inside air introduction port 413 is introduced. The inside/outside air casing 41 has a communication passage 414 that communicates the first introduction space 410A and the second introduction space 410B.

An air filter 42 is arranged inside the inside/outside air casing 41. The air filter 42 is a filter material that removes dust and the like from the air introduced into the inside/outside air casing 41. The air filter 42 is formed of a material having air permeability. The material forming the air filter 42 may be a non-woven fabric with resin fiber such as PET or PP.

An opening/closing member 43 for opening/closing each of the introduction ports 411, 421, 413 is arranged on the inside/outside air casing 41, upstream of the air filter 42 in the air flow. The opening/closing member 43 has a first opening/closing door 431 that selectively opens/closes the outside air introduction port 411 and the first inside air introduction port 412, and a second opening/closing door 432 that selectively opens/closes the second inside air introduction port 413 and the communication passage 414.

The first opening/closing door 431 is composed of a rotary door that rotates about a first door shaft 431a. The second opening/closing door 432 is composed of a rotary door that rotates about the second door shaft 432a, similarly to the first opening/closing door 431.

The inside/outside air switching unit 40 opens the outside air introduction port 411 by the first opening/closing door 431 and opens the second inside air introduction port 413 by the second opening/closing door 432, such that the inside air flows inside of the separation cylinder 50. That is, the inside/outside air casing 41 allows the inside air introduced from the second inside air introduction port 413 to flow inside the separation cylinder 50, and allows the outside air introduced from the outside air introduction port 411 to flow outside the separation cylinder 50.

The separation cylinder 50 is a tubular member that extends in the axial direction DRa. The separation cylinder 50 extends along the axial direction DRa, and the both ends in the axial direction DRa are open. The separation cylinder 50 includes a tubular portion arranged inside the centrifugal fan 10 in the radial direction DRr. The separation cylinder 50 is made of a resin (for example, polypropylene) having a certain degree of elasticity and excellent strength.

At least a part of the separation cylinder 50 is positioned inside the fan casing 30 so that the air passing through the suction port 31 is separated into the inner air flowing inside the tubular portion and the outer air flowing outside the tubular portion.

The separation cylinder 50 has an air introduction portion 51 located inside the inside/outside air casing 41, an air outlet portion 52 located inside the fan casing 30, and an intermediate portion 53 connecting the air introduction portion 51 and the air outlet portion 52.

The air introduction portion 51 is a portion of the separation cylinder 50 that is connected to the inside/outside air casing 41. The upstream end of the air introduction portion 51 opens toward the second introduction space 410B so that the air introduced into the second introduction space 410B of the inside/outside air casing 41 flows into the separation cylinder 50. Specifically, the air introduction portion 51 has a substantially rectangular outer shape when viewed from the one side in the axial direction DRa. The air introduction portion 51 has a size capable of covering substantially half of the area of the bell mouth 33 of the fan casing 30.

The air outlet portion 52 and the intermediate portion 53 guide the inner air flowing inside the separation cylinder 50 and the outer air flowing outside the separation cylinder 50 to the centrifugal fan 10. The air outlet portion 52 has a shape expanded in the radial direction DRr as going toward the other side in the axial direction DRa in order to guide the inner air and the outer air to the first blade passage 110 and the second blade passage 120. That is, the diameter of the air outlet portion 52 increases toward the other side in the axial direction DRa.

At least a part of the intermediate portion 53 is inclined with respect to the axial direction DRa so that the central axis of the air outlet portion 52 coincides with the fan axis CL. The cross-sectional area inside the intermediate portion 53 is smaller than that of the air introduction portion 51 and the air outlet portion 52.

The separation cylinder 50 is arranged so that the downstream end of the air outlet portion 52 faces the inner end surface 151 of the separation plate 15 of the centrifugal fan 10 in the radial direction DRr. As a result, the outer air flowing outside the separation cylinder 50 flows into the first blade passage 110 of the centrifugal fan 10, and the inner air flowing inside the separation cylinder 50 flows into the second blade passage 120 of the centrifugal fan 10.

Next, the shape, dimensions, and the like of the centrifugal fan 10 will be described with reference to FIG. 4. In this embodiment, for convenience of explanation, the dimensions of components are defined as follows. Regarding the plural first blades 11, the smallest inner diameter dimension in the first front edge portion 111 is defined as a first front edge diameter Dbi1, and the smallest outer diameter dimension in the first rear edge portion 112 is defined as a first rear edge diameter Dbo1. For the plural second blades 12, the largest inner diameter dimension in the second front edge portion 121 is a second front edge diameter Dbi2, and the largest outer diameter dimension in the second rear edge portion 122 is a second rear edge diameter Dbo2. For the side plate 14, the smallest inner diameter dimension is defined as a side plate inner diameter Dsp. For the main plate 13, the largest outer diameter dimension is defined as a main plate outer diameter Dbp. Regarding the separation plate 15, the smallest inner diameter dimension is defined as a separation plate inner diameter Dmp2, and the largest outer diameter dimension is defined as a separation plate outer diameter Dmp1.

Figure 4:
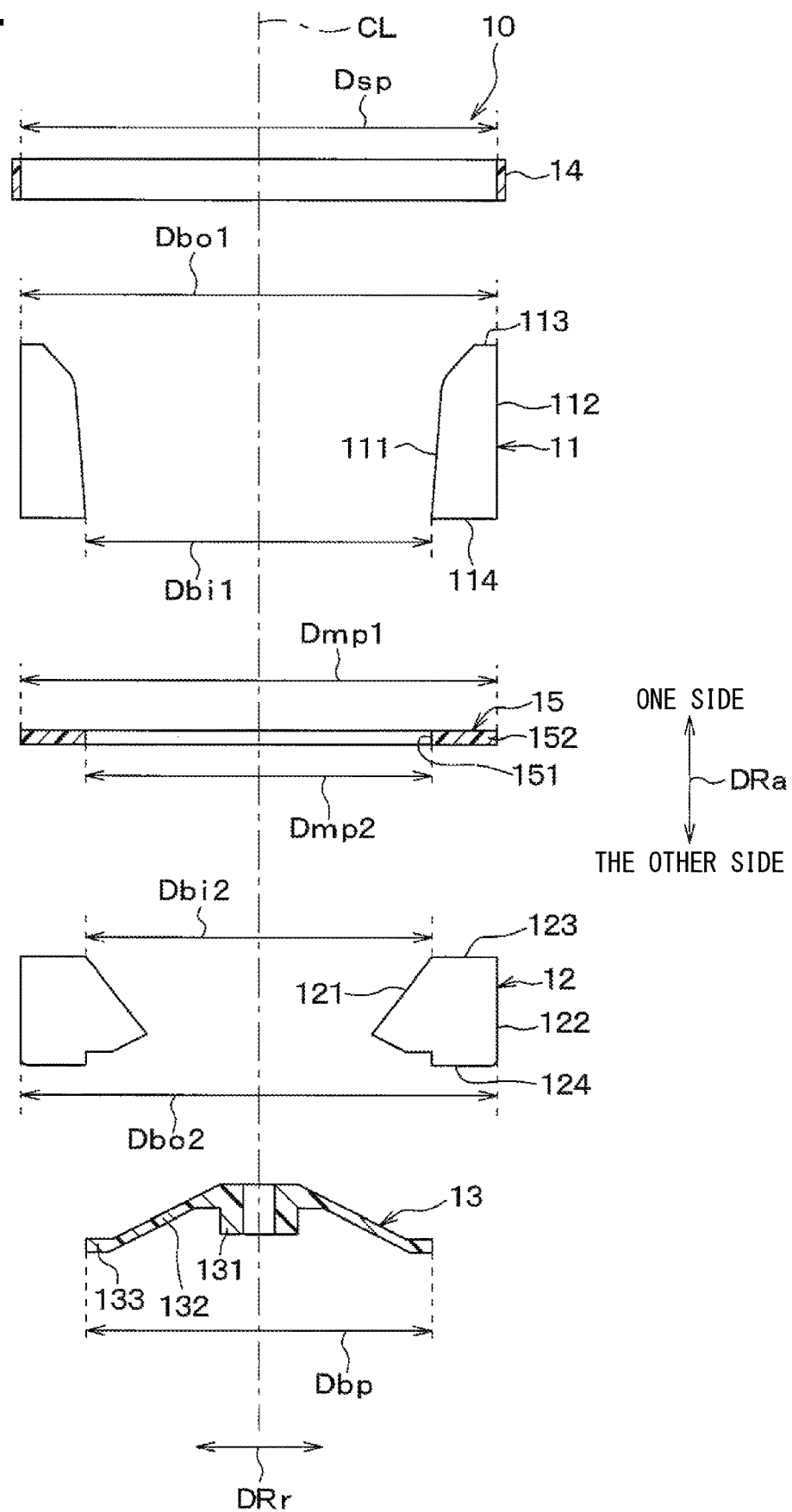
FIG. 4 is an exploded view of the centrifugal fan according to the embodiment.

As shown in FIG. 4, the plural first blades 11 are set such that the radial dimension on the other side in the axial direction DRa is smaller than or equal to the radial dimension on the one side in the direction DRa, in each of the first front edge portion 111 and the first rear edge portion 112, so that undercut does not occur. Specifically, the inner diameter of the first front edge portion 111 adjacent to the first lower end portion 114 is smaller than the inner diameter of the first front edge portion 111 adjacent to the first upper end portion 113. Further, in the first rear edge portion 112, the outer diameter dimension adjacent to the first lower end portion 114 is the same as the outer diameter dimension adjacent to the first upper end portion 113.

Similarly, the plural second blades 12 are set such that the radial dimension on the other side in the axial direction DRa is smaller than or equal to the radial dimension on the one side in the axial direction DRa, in each of the second front edge portion 121 and the second rear edge portion 122 so as not to cause an undercut. Specifically, in the second front edge portion 121, the inner diameter dimension adjacent to the second lower end portion 124 is smaller than the inner diameter dimension adjacent to the second upper end portion 123. Further, the outer diameter dimension of the second rear edge portion 122 adjacent to the second lower end portion 124 is the same as the outer diameter dimension adjacent to the second upper end portion 123.

The separation plate 15 is set so that the separation plate inner diameter Dmp2 is more than or equal to the main plate outer diameter Dbp, more than or equal to the second front edge diameter Dbi2, and smaller than or equal to the first front edge diameter Dbi1. That is, the separation plate inner diameter Dmp2 of the separation plate 15 is set so as to satisfy both the following formulas F1 and F2.

$$Dmp2 \geq Dbp \tag{F1}$$

$$Dbi2 \leq Dmp2 \leq Dbi1 \tag{F2}$$

Specifically, the separation plate inner diameter Dmp2, the main plate outer diameter Dbp, the second front edge diameter Dbi2, and the first front edge diameter Dbi1 are set to have approximately the same value in the centrifugal fan 10. If the formulas F1 and F2 are satisfied, the separation plate inner diameter Dmp2, the main plate outer diameter Dbp, the second front edge diameter Dbi2, and the first front edge diameter Dbi1 may be set different from each other.

Further, the separation plate outer diameter Dmp1 of the separation plate 15 is set to be smaller than or equal to the side plate inner diameter Dsp, more than or equal to the second rear edge diameter Dbo2, and smaller than or equal to the first rear edge diameter Dbo1. That is, the separation plate 15 has the separation plate outer diameter Dmp1 so as to satisfy both the following formulas F3 and F4.

$$Dmp1 \leq Dsp \tag{F3}$$

$$Dbo2 \leq Dmp1 \leq Dbo1 \tag{F4}$$

Specifically, the separation plate outer diameter Dmp1, the side plate inner diameter Dsp, the second rear edge diameter Dbo2, and the first rear edge diameter Dbo1 are set to have approximately the same value in the centrifugal fan 10. That is, the centrifugal fan 10 is configured so that the second rear edge diameter Dbo2 coincides with the first rear edge diameter Dbo1. If the formulas F3 and F4 are satisfied, the separation plate outer diameter Dmp1, the side plate inner diameter Dsp, the second rear edge diameter Dbo2, and the first rear edge diameter Dbo1 may be different from each other.

Figure 5:
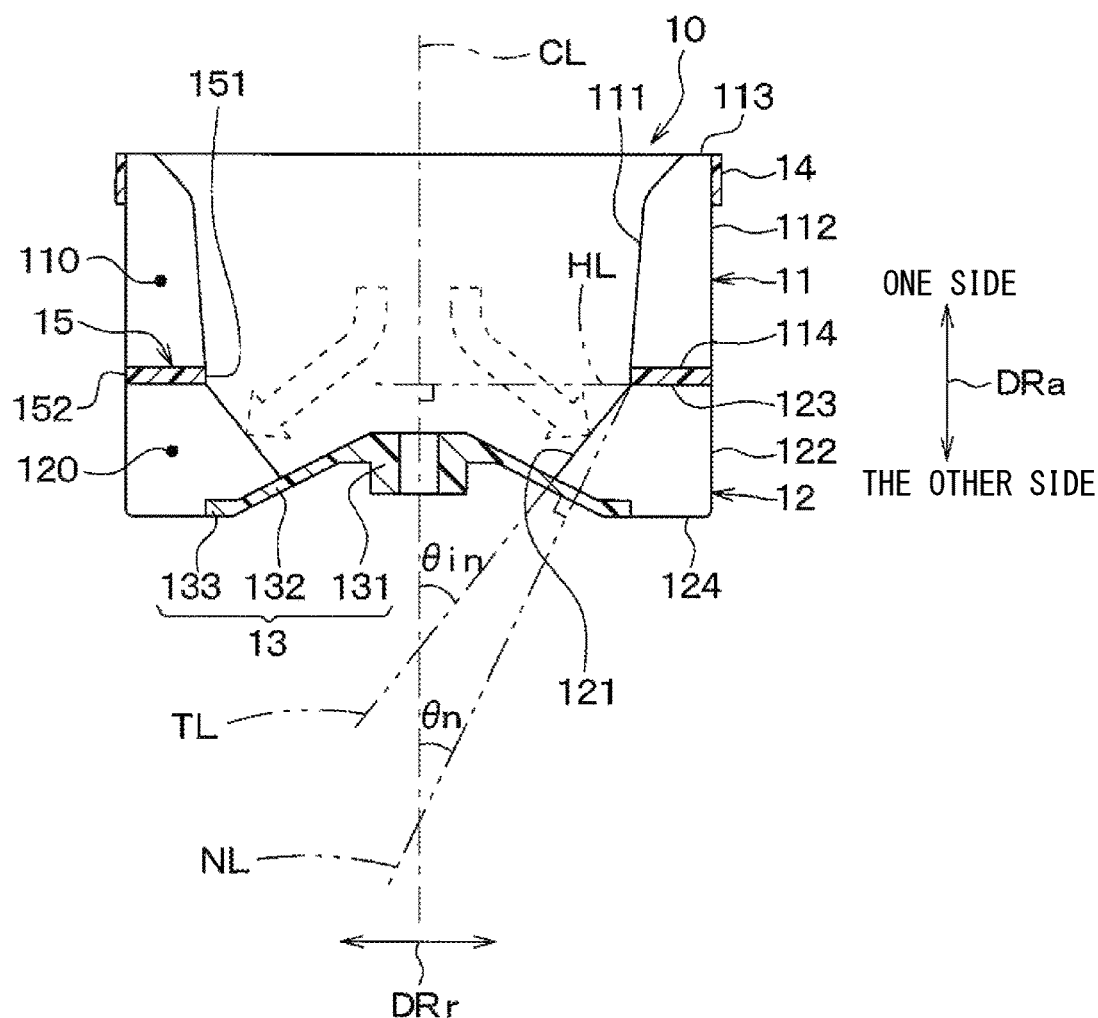
FIG. 5 is an explanatory diagram for explaining an inclination angle of a second blade of the centrifugal fan.

As shown in FIG. 5, the inner diameter dimension of the second front edge portion 121 of the second blade 12 is reduced from the one side to the other side in the axial direction DRa. An end portion of the second front edge portion 121 of the second blades 12 on the other side in the axial direction DRa has the inner diameter smaller than the main plate outer diameter Dbp. That is, in the plural second blades 12, a part of the second front edge portion 121 adjacent to the second lower end portion 124 is inclined with respect to the fan axis CL so as to overlap with the main plate 13 in the axial direction DRa.

When air flows in at an angle close to perpendicular to the second front edge portions 121 of the plural second blades 12, it is possible to suppress the separation of air at the second front edge portions 121 of the plural second blades 12.

As shown by the arrow HL in FIG. 5, air flows in between the plural second blades 12, in the centrifugal fan 10 of the present embodiment. That is, air may flow between the second blades 12 along the axial direction DRa, or may flow in a direction along the inclined portion 132 of the main plate 13 as shown by the arrow HL in FIG. 5.

In view of these, the plural second blades 12 are set such that the meridian angle θin is within a range from the main plate normal angle θn to the angle perpendicular to the fan axis CL (that is, 90 degrees). That is, the meridian angle θin of the plural second blades 12 is set so as to satisfy the following formula F5.

$$\theta n \leq \theta in \leq 90° \tag{F5}$$

The meridian angle θin is the inclination angle of the inner peripheral edge portion of the plural second blades 12 on the meridian plane with respect to the fan axis CL. In other words, the meridian angle θin is defined between the tangent TL of the second front edge portion 121 and the fan axis CL. Further, the main plate normal angle θn is an inclination angle of the normal vector NL at the inclined portion 132 of the main plate 13 with respect to the fan axis CL. In other words, the main plate normal angle θn is defined between the normal vector NL and the fan axis CL.

Next, the operation of the centrifugal blower 1 will be described. The centrifugal blower 1 can be set among, as an air suction mode, an outside air mode for sucking outside air, an inside air mode for sucking inside air, and an inside/outside air mode for separately sucking outside air and inside air at the same time.

At the outside air mode, only the outside air is introduced inside the inside/outside air casing 41. The centrifugal blower 1 is configured such that the first opening/closing door 431 is displaced at a position where the outside air introduction port 411 is opened and the second opening/closing door 432 is displaced at a position where the communication passage 414 is opened, at the outside air mode.

At the inside air mode, only the inside air is introduced inside the inside/outside air casing 41. In the centrifugal blower 1, at the inside air mode, the first opening/closing door 431 is displaced to the position where the first inside air introduction port 412 is opened, and the second opening/closing door 432 is displaced to the position where the second inside air introduction port 413 is opened.

At the inside/outside air mode, outside air and inside air are introduced inside the inside/outside air casing 41. The centrifugal blower 1 is configured such that the first opening/closing door 431 is displaced at a position where the outside air introduction port 411 is opened and the second opening/closing door 432 is displaced at a position where the second inside air introduction port 413 is opened, at the inside/outside air mode.

In the centrifugal blower 1, when the centrifugal fan 10 is rotated by the electric motor 20 in the inside/outside air mode, as shown in FIG. 1, outside air is introduced from the outside air introduction port 411 into the first introduction space 410A, and inside air is introduced into the second introduction space 410B from the second inside air introduction port 413.

The outside air introduced into the first introduction space 410A is sucked into the first blade passage 110 of the centrifugal fan 10 via the outside of the separation cylinder 50. The outside air sucked into the first blade passage 110 is blown out to the first blowout passage 350A.

The inside air introduced into the second introduction space 410B is sucked into the second blade passage 120 of the centrifugal fan 10 via the inside of the separation cylinder 50. The outside air sucked into the second blade passage 120 is blown out to the second blowout passage 350B.

Although not shown, the outside air flowing through the first blowout passage 350A and the inside air flowing through the second blowout passage 350B are introduced into the air conditioning unit from the fan casing 30, adjusted to have a desired temperature inside the air conditioning unit, and then blown into the cabin through different outlets.

In the centrifugal fan 10 of the centrifugal blower 1, the plural first blades 11 and the plural second blades 12 are connected with each other via the separation plate 15 without being in direct contact with each other. Therefore, the first blade 11 and the second blade 12 can be designed as independent blades.

The shape, dimensions, and the like of each component of the centrifugal fan 10 are appropriately set so that the centrifugal fan 10 can be integrally molded by the die sliding in the axial direction DRa. That is, the centrifugal fan 10 is set so that the separation plate inner diameter Dmp2 of the separation plate 15 satisfies both of the formulas F1 and F2, and the separation plate outer diameter Dmp1 of the separation plate 15 satisfies both of the formulas F3 and F4. Accordingly, since there is no undercut when the centrifugal fan 10 is molded by the die sliding in the axial direction DRa, the centrifugal fan 10 can be manufactured by integral molding with the die sliding in the axial direction DRa.

Therefore, according to the present embodiment, it is possible to realize the centrifugal fan 10 and the centrifugal blower 1 having excellent manufacturability while ensuring the flexibility in designing the first blade 11 and the second blade 12.

Further, the inner diameter dimension of the second front edge portion 121 in the second blade 12 of the centrifugal fan 10 decreases from the one side to the other side in the axial direction DRa, and an end portion of the second front edge portion 121 at the other side in the axial direction DRa has the inner diameter dimension smaller than the main plate outer diameter Dbp.

Accordingly, the centrifugal fan 10 can increase the length of the connecting portion between the second blade 12 and the main plate 13 on the other side in the axial direction DRa, so that the connecting strength between the second blade 12 and the main plate 13 can be sufficiently secured.

The plural second blades 12 are set to have the meridian angle θn within a range from the main plate normal angle θn to the angle perpendicular to the fan axis CL. Accordingly, the air sucked from the suction port 31 tends to flow in at an angle approximately perpendicular to the second front edge portion 121 of the second blade 12. As a result, the separation of air at the second front edge portion 121 is suppressed, so that air turbulence is less likely to occur at the second blade passage 120, and the noise can be reduced.

Further, the plural second blades 12 are configured so that the second rear edge diameter Dbo2 coincides with the first rear edge diameter Dbo1. In this case, since the second rear edge diameter Dbo2 is set to have a size that coincides the first rear edge diameter Dbo1, the outer diameter of a portion of the centrifugal fan 10 composed of the second blades 12 becomes large. Therefore, the fan performance of the portion of the centrifugal fan 10 composed of the second blades 12 is improved. Here, "coincides" does not mean that the dimensions to be compared are exactly the same, but includes that the dimensions to be compared have a slight deviation of the manufacturing error level (for example, within 5% of the average dimension).

Further, the second rear edge portion 122 of the plural second blade 12 is set at position deviated from the position of the first rear edge portion 112 of the plural first blade 11 in the circumferential direction of the fan axis CL. In this way, the first blade passage 110 and the second blade passage 120 are offset from each other in the circumferential direction of the fan axis CL by setting the second rear edge portion 122 of the second blade 12 at a position deviated from the first rear edge portion 112 of the first blade 11 in the circumferential direction of the fan axis CL. Accordingly, the noise generated on the outlet side of the first blade passage 110 and the noise generated on the outlet side of the second blade passage 120 are out of phase with each other, so that the noise (so-called Nz sound) can be suppressed on the air blowout side of the centrifugal fan 10.

OTHER EMBODIMENTS

Figure 6:
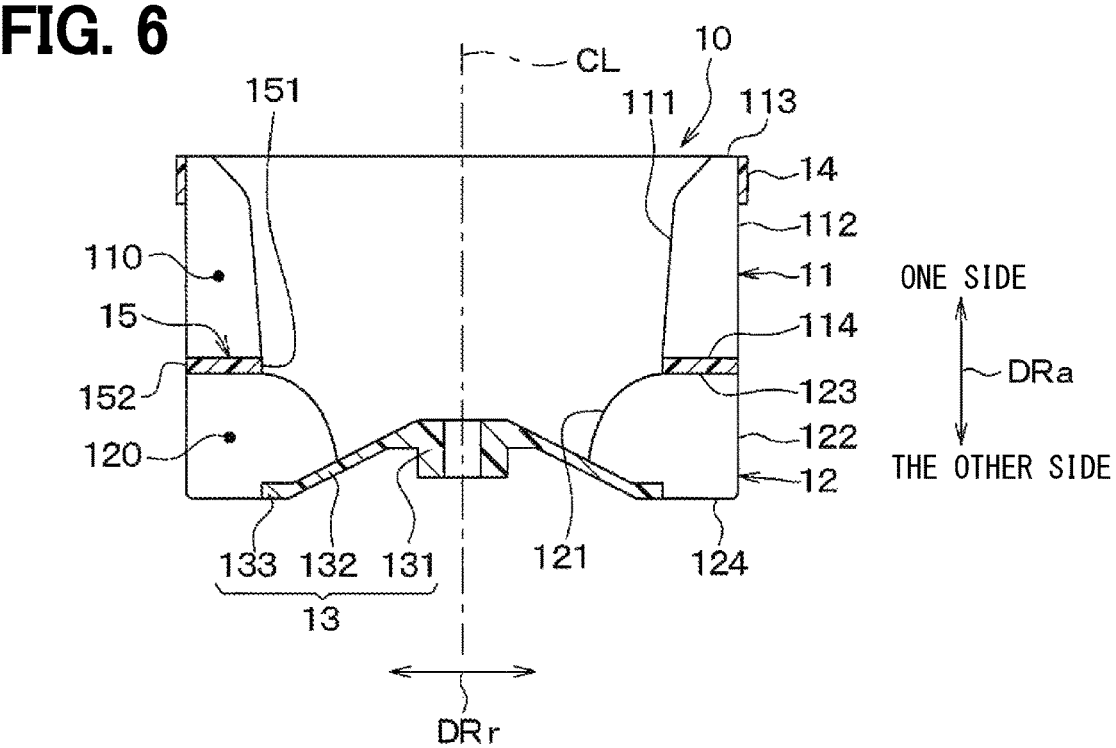
FIG. 6 is a schematic cross-sectional view of a centrifugal fan according to a first modification.
Figure 7:
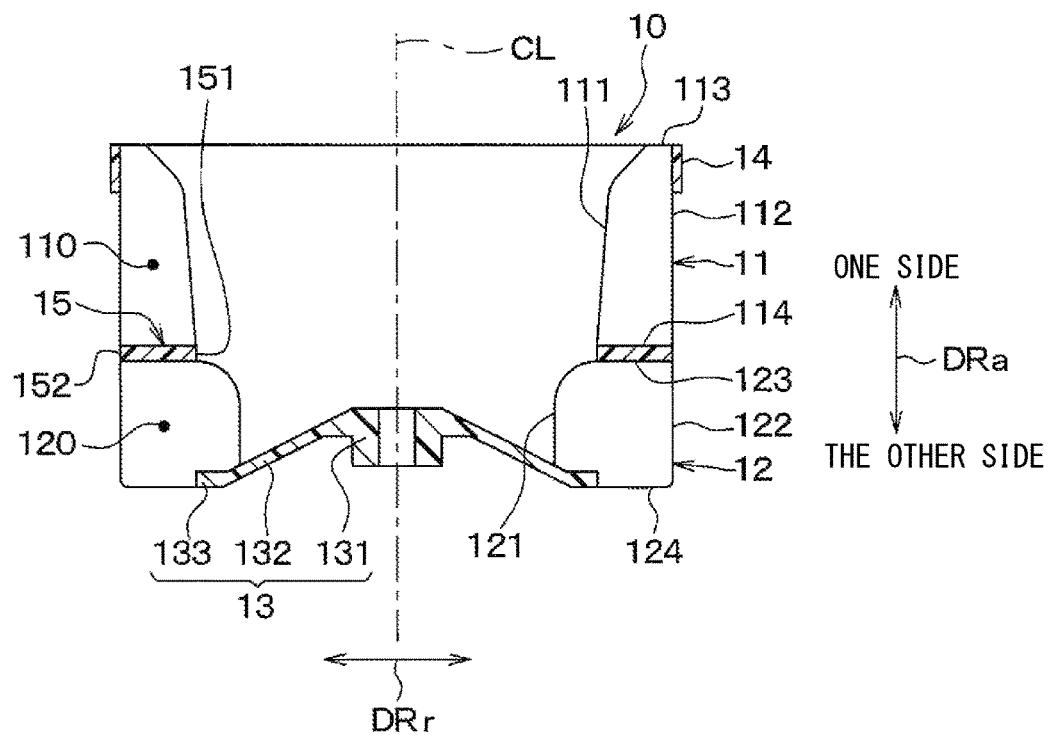
FIG. 7 is a schematic cross-sectional view of a centrifugal fan according to a second modification.
Figure 8:
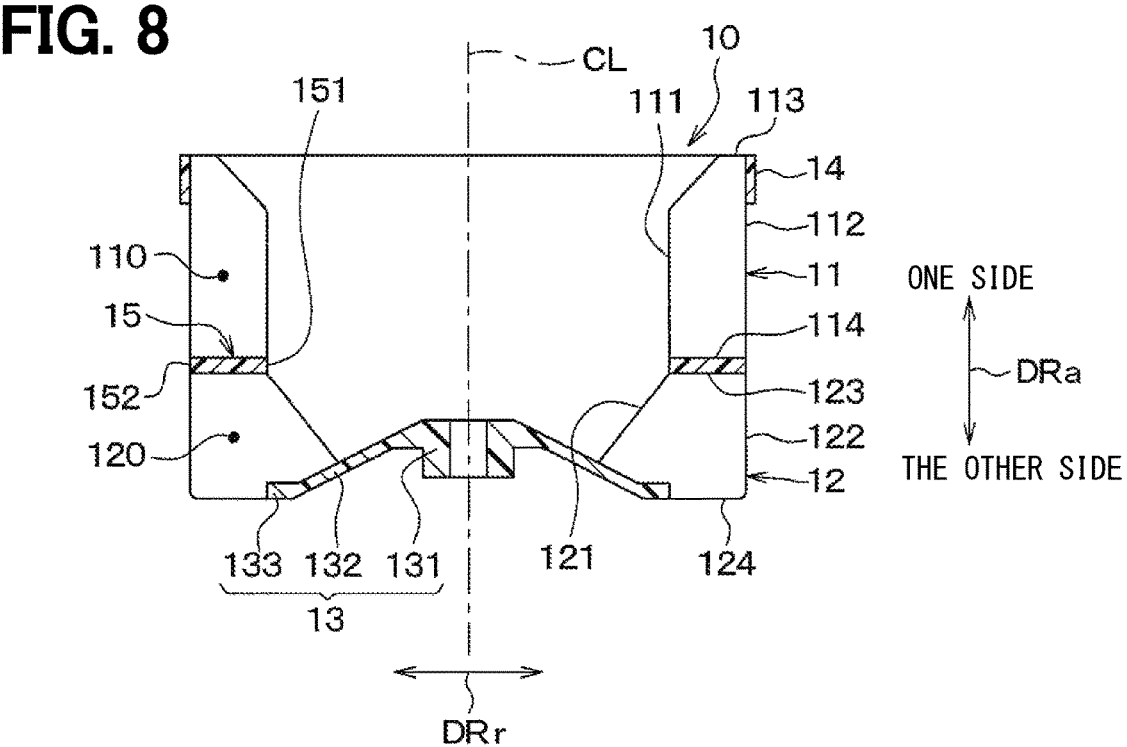
FIG. 8 is a schematic cross-sectional view of a centrifugal fan according to a third modification.
Figure 9:
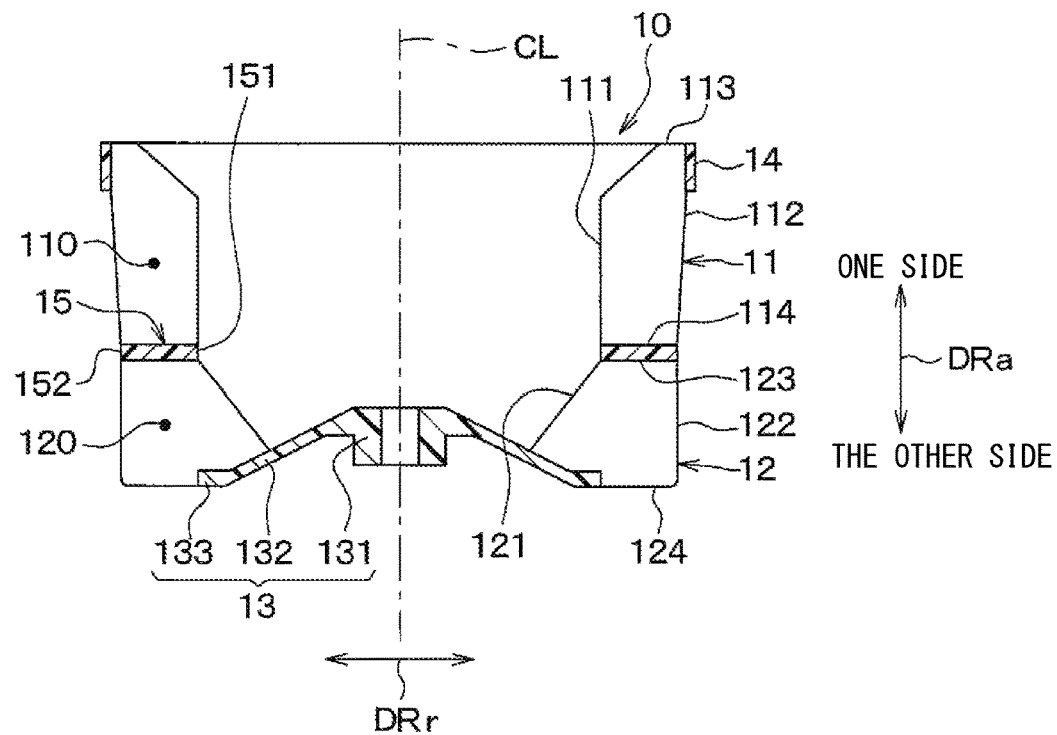
FIG. 9 is a schematic cross-sectional view of a centrifugal fan according to a fourth modification.
Figure 10:
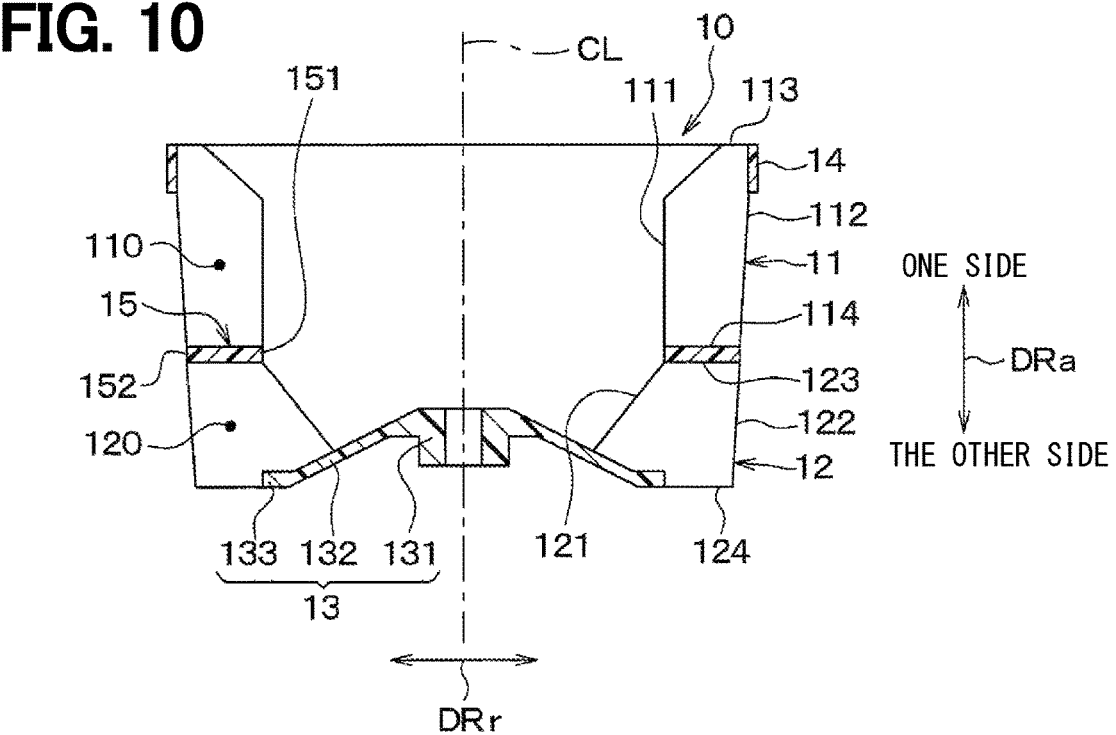
FIG. 10 is a schematic cross-sectional view of a centrifugal fan according to a fifth modification.
Figure 11:
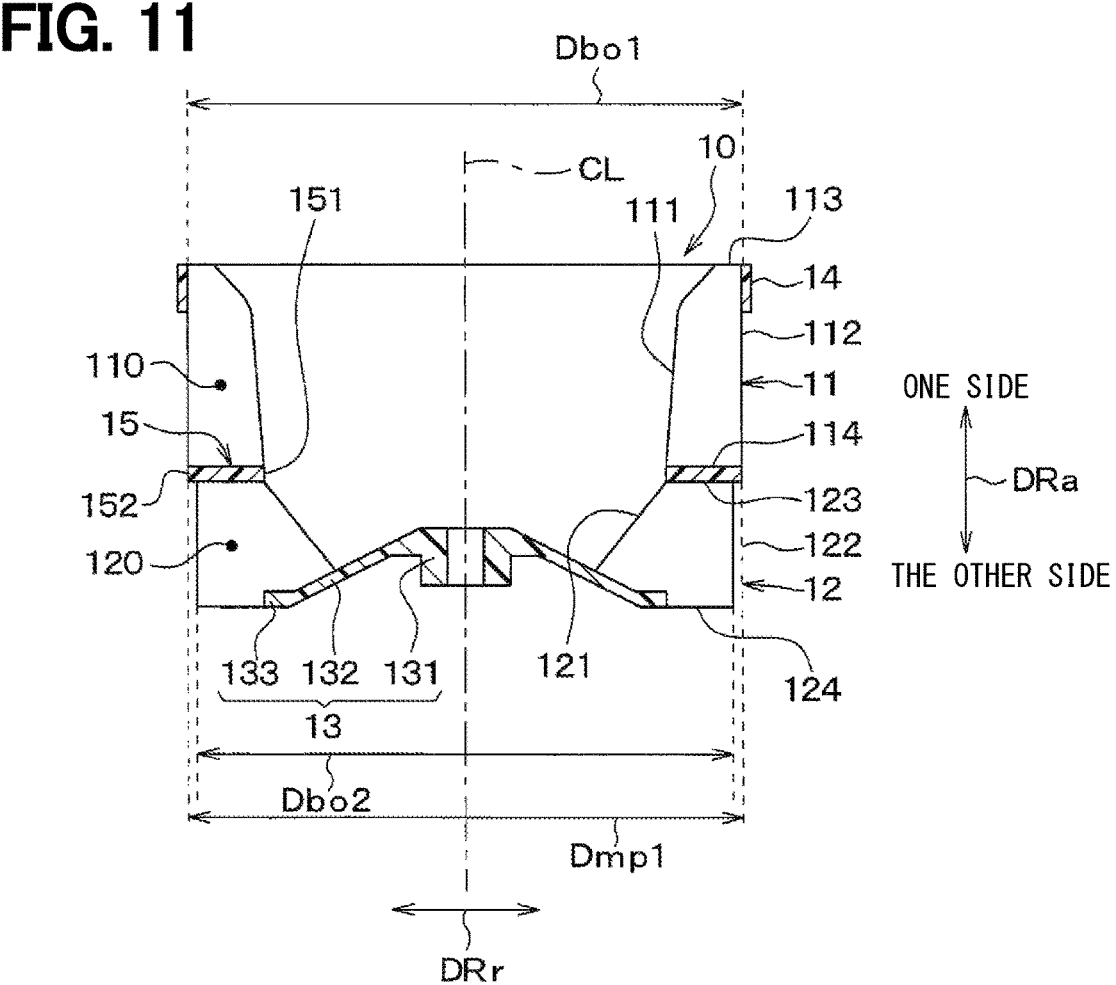
FIG. 11 is a schematic cross-sectional view of a centrifugal fan according to a sixth modification.
Figure 12:
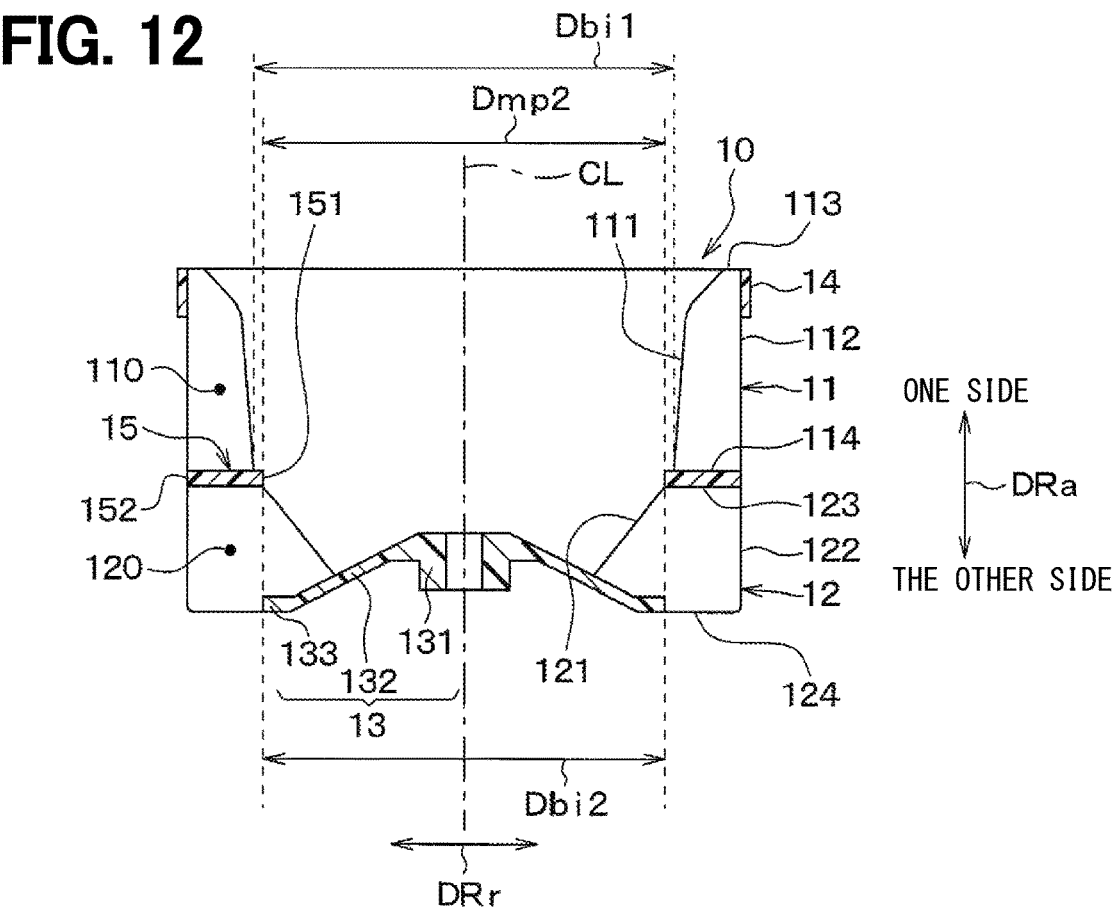
FIG. 12 is a schematic cross-sectional view of a centrifugal fan according to a seventh modification.
Figure 13:
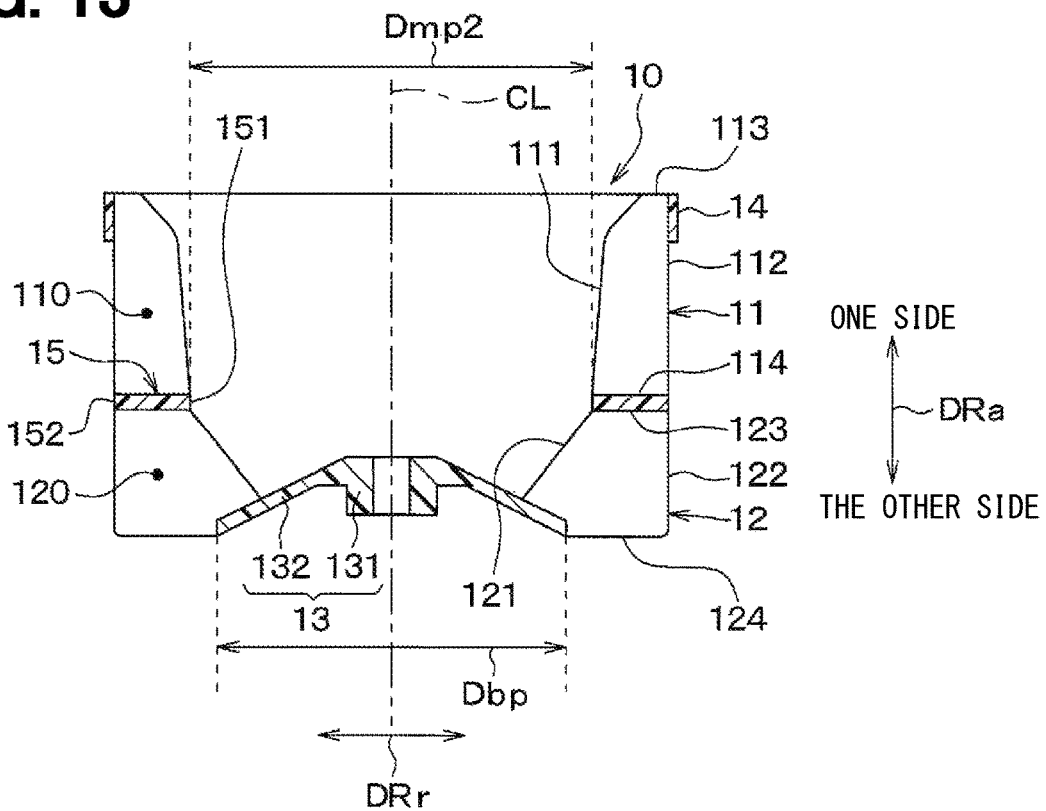
FIG. 13 is a schematic cross-sectional view of a centrifugal fan according to an eighth modification.
Figure 14:
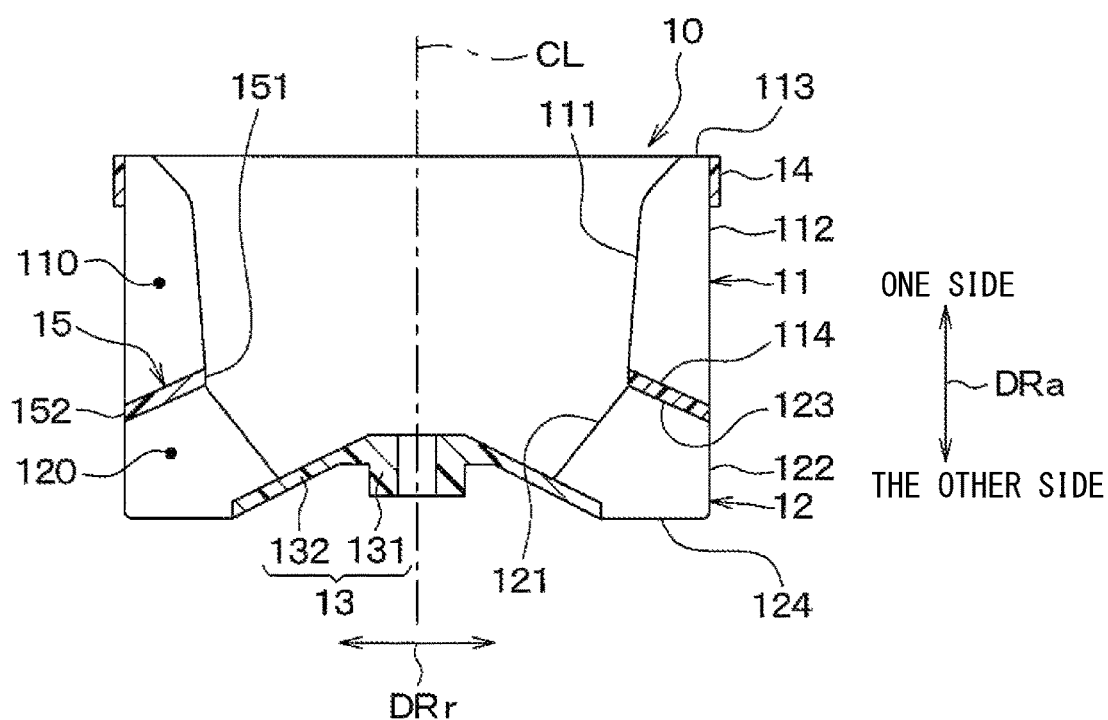
FIG. 14 is a schematic cross-sectional view of a centrifugal fan according to a ninth modification.

The representative embodiment of the present disclosure has been described above. However, the present disclosure is not limited to the embodiment, and may be variously modified as follows.
(First Modification)
The centrifugal fan 10 is not limited to the embodiment in which the second front edge portion 121 of the second blade 12 extends linearly along the direction intersecting the axial direction DRa. For example, as shown in FIG. 6, the second front edge portion 121 of the second blade 12 in the centrifugal fan 10 may have a shape of drawing an arcuate curve.
(Second Modification)
Further, as shown in FIG. 7, for example, the second front edge portion 121 of the second blade 12 of the centrifugal fan 10 may have a shape combining an arcuate curve and a straight line extending along the axial direction DRa.
(Third Modification)
In the embodiment, a draft is set on the first front edge portion 111 of the first blade 11 in the centrifugal fan 10, but the centrifugal fan 10 is not limited to this. As shown in FIG. 8, for example, the first front edge portion 111 of the first blade 11 of the centrifugal fan 10 does not have to have a draft. That is, at least a part of the first front edge portion 111 of the first blade 11 may extend along the axial direction DRa.
(Fourth Modification)
In the embodiment, as the centrifugal fan 10, the first rear edge portion 112 of the first blade 11 extends along the axial direction DRa, but the centrifugal fan 10 is not limited thereto. For example, as shown in FIG. 9, the first rear edge portion 112 of the first blade 11 of the centrifugal fan 10 may have a draft. That is, the distance between the first rear edge portion 112 and the fan axis CL may decrease from the one side to the other side in the axial direction DRa in the first blade 11.
(Fifth Modification)
Further, in the centrifugal fan 10, for example, as shown in FIG. 10, a draft may be set on both the first rear edge portion 112 of the first blade 11 and the second rear edge portion 122 of the second blade 12. That is, in the centrifugal fan 10, the distance between the first rear edge portion 112 of the first blade 11 and the fan axis CL and the distance between the second rear edge portion 122 of the second blade 12 and the fan axis CL may become smaller from the one side toward the other side in the axial direction DRa.
(Sixth Modification)
In the embodiment, the centrifugal fan 10 is configured such that the second rear edge diameter Dbo2 of the second blade 12 is the same as the first rear edge diameter Dbo1 of the first blade 11 and the separation plate outer diameter Dmp1. However, the centrifugal fan 10 is not limited to this. In the centrifugal fan 10, for example, as shown in FIG. 11, the second rear edge diameter Dbo2 of the second blade 12 may be smaller than the first rear edge diameter Dbo1 of the first blade 11 and the separation plate outer diameter Dmp1.
(Seventh Modification) In the embodiment, the centrifugal fan 10 is configured such that the first front edge diameter Dbi1 of the first blade 11 is the same as the second front edge diameter Dbi2 of the second blade 12 and the separation plate inner diameter Dmp2, but the centrifugal fan 10 is not limited to this. In the centrifugal fan 10, for example, as shown in FIG. 12, the first front edge diameter Dbi1 of the first blade 11 may be larger than the second front edge diameter Dbi2 of the second blade 12 and the separation plate inner diameter Dmp2.
(Eighth Modification)
In the embodiment, the main plate 13 of the centrifugal fan 10 has the inclined portion 132 and the flat portion 133, but the centrifugal fan 10 is not limited thereto. For the centrifugal fan 10, for example, as shown in FIG. 13, the main plate 13 may not have the flat portion 133. In the centrifugal fan 10 shown in FIG. 13, the separation plate inner diameter Dmp2 is larger than the main plate outer diameter Dbp.
(Ninth Modification)
In the embodiment, the centrifugal fan 10 is illustrated in which the plate surface of the separation plate 15 expands so as to be orthogonal to the fan axis CL, but the centrifugal fan 10 is not limited thereto. For example, as shown in FIG. 14, the plate surface of the separation plate 15 is inclined in the same direction as the inclined portion 132 of the main plate 13 of the centrifugal fan
(Other Modifications)
In the embodiment, the inner diameter of the second front edge portion 121 of the second blade 12 decreases from the one side to the other side in the axial direction DRa, but the centrifugal fan 10 is not limited to this. The centrifugal fan 10 may have a shape in which the second front edge portion 121 of the second blade 12 extends linearly along the axial direction DRa.

In the embodiment, the position of the second rear edge portion 122 of the second blade 12 is deviated with respect to the first rear edge portion 112 of the first blade 11 in the circumferential direction of the fan axis CL. The centrifugal fan 10 is not limited to this. In the centrifugal fan 10, for example, the position of the second rear edge portion 122 of the second blade 12 may be set to the same position as the first rear edge portion 112 of the first blade 11.

In the embodiment, the inside/outside air casing 41 has one outside air introduction port and two inside air introduction ports, but the inside/outside air casing 41 is not limited thereto. The inside/outside air casing 41 may have one outside air introduction port and one inside air introduction port while it is possible to separately draw in the outside air and the inside air.

In the embodiment, the opening/closing member 43 is composed of the first opening/closing door 431 and the second opening/closing door 432, but is not limited thereto. The opening/closing member 43 may have, for example, three or more opening/closing doors. Further, the opening/closing door of the opening/closing member 43 is not limited to the rotary door, and may be composed of, for example, a cantilever plate door, a sliding door, or the like.

In the embodiment, the centrifugal blower 1 of the present disclosure is applied to a vehicle air conditioner in which inside air and outside air form two layers, but the application target of the centrifugal blower 1 is not limited to this. The centrifugal blower 1 of the present disclosure can be applied to devices other than the inside/outside air two-layer type vehicle air conditioner.

In the embodiment, it is needless to say that the elements configuring the embodiments are not necessarily essential except in the case where those elements are clearly indicated to be essential in particular, the case where those elements are considered to be obviously essential in principle, and the like.

In the embodiment, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiment, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

OVERVIEW

According to the first aspect shown in part or all of the embodiment, the plural first blades and the plural second blades are connected via the separation plate without being in direct contact with each other in the centrifugal fan. In the front edge portion and the rear edge portion of the first blades, the diameter dimension on the other side in the axial direction is smaller than or equal to the diameter dimension on the one side in the axial direction. In the front edge portion and the rear edge portion of the second blades, the diameter dimension on the other side in the axial direction is smaller than or equal to the diameter dimension on the one side in the axial direction. In the separation plate, the inner diameter of the separation plate is larger than or equal to the outer diameter of the main plate, larger than or equal to the second front edge diameter, and smaller than or equal to the first front edge diameter. The outer diameter of the separation plate is small than or equal to the inner diameter of the side plate, larger than or equal to the second rear edge diameter, and smaller than or equal to the first rear edge diameter.

According to the second aspect, in the centrifugal fan, the inner diameter dimension of the front edge portion of the plural second blades decreases from the one side to the other side in the axial direction, and the inner diameter dimension of an end portion of the front edge portion of the second blades at the other side in the axial direction is smaller than the outer diameter of the main plate.

Accordingly, the length of the connecting portion between the second blade and the main plate can be increased on the other side in the axial direction, so that the connection strength between the second blade and the main plate can be sufficiently secured.

According to the third aspect, an inclination angle of an inner peripheral edge portion of the plurality of second blades on a meridian plane with respect to the fan axis is defined as a meridian angle. An inclination angle of a normal vector of the main plate with respect to the fan axis is defined as a main plate normal angle. The plurality of second blades are set such that the meridian angle is within a range from the main plate normal angle to an angle perpendicular to the fan axis.

Accordingly, the air sucked from the suction port tends to flow in at an angle approximately perpendicular to the front edge portion of the second blade. As a result, air turbulence between the second blades is less likely to occur, and noise can be reduced. The "meridian plane" is a plane obtained by rotationally projecting the shape of the blade to the cross section including the fan axis of the centrifugal fan.

According to the fourth aspect, the centrifugal fan is configured such that the second rear edge diameter of the plural second blades is the same as the first rear edge diameter. In this way, when the diameter of the second rear edge is set the same as the diameter of the first rear edge, the outer diameter of a portion of the centrifugal fan composed of the plural second blades becomes large, so that the plural second blades in the centrifugal fan become large. Therefore, the fan performance of the portion composed of the second blades is improved. Here, "the same" does not mean that the dimensions to be compared are exactly the same, but includes that the dimensions to be compared may have a slight deviation within the manufacturing error level (for example, within 5% of the average dimension).

According to the fifth aspect, the rear edge portion of the plurality of second blades is shifted in a circumferential direction of the fan axis with respect to the rear edge portion of the plurality of first blades. In this way, if the rear edge of the second blade is set at a position deviated from the rear edge of the first blade in the circumferential direction of the fan axis, the first blade passage and the second blade passage are offset in the circumferential direction of to the fan axis. Accordingly, the noise generated on the outlet side of the first blade passage and the noise generated on the outlet side of the second blade passage are out of phase with each other, so that noise (so-called Nz sound) generated on the air blowout side of the centrifugal fan can be suppressed.

According to the sixth aspect, the first blades and the second blades are connected via the separation plate without being in direct contact with each other in the centrifugal fan of the centrifugal blower. In the front edge portion and the rear edge portion of the first blades, the diameter dimension on the other side in the axial direction is smaller than or equal to the diameter dimension on the one side in the axial direction. In the front edge portion and the rear edge portion of the second blades, the diameter dimension on the other side in the axial direction is smaller than or equal to the diameter dimension on the one side in the axial direction. In the separation plate, the inner diameter of the separation plate is larger than or equal to the outer diameter of the main plate, larger than or equal to the second front edge diameter, and smaller than or equal to the first front edge diameter. Moreover, the outer diameter of the separation plate is smaller than or equal to the inn diameter of the side plate, larger than or equal to the second rear edge diameter, and smaller than or equal to the first rear edge diameter.

What is claimed is:

1. A centrifugal fan configured to draw in air from one side in an axial direction and blow out air outward in a radial direction, the centrifugal fan comprising:
   a plurality of first blades arranged around a fan axis;
   a plurality of second blades arranged around the fan axis and located on the other side of the plurality of first blades in the axial direction;
   a side plate formed in a ring shape around the fan axis to support a part of the plurality of first blades located on the one side in the axial direction;

a main plate that supports a part of the plurality of second blades located on the other side in the axial direction; and a separation plate connecting the plurality of first blades to the plurality of second blades to suppress mixing of air flowing through a first blade passage formed between the plurality of first blades and air flowing through a second blade passage formed between the plurality of second blades, wherein the plurality of first blades and the plurality of second blades are connected to each other via the separation plate without a direct contact, a front edge portion of the plurality of first blades has a first front edge diameter which is a smallest inner diameter dimension in the front edge portion of the plurality of first blades, a rear edge portion of the plurality of first blades has a first rear edge diameter which is a smallest outer diameter dimension in the rear edge portion of the plurality of first blades, a front edge portion of the plurality of second blades has a second front edge diameter which is a largest inner diameter dimension in the front edge portion of the plurality of second blades, a rear edge portion of the plurality of second blades has a second rear edge diameter which is a largest outer diameter dimension in the rear edge portion of the plurality of second blades, the side plate has a side plate inner diameter which is a smallest inner diameter dimension in the side plate, the main plate has a main plate outer diameter which is a largest outer diameter dimension in the main plate, the separation plate has a separation plate inner diameter which is a smallest inner diameter dimension in the separation plate, the separation plate has a separation plate outer diameter which is a largest outer diameter dimension in the separation plate, the front edge portion and the rear edge portion of the plurality of first blades have a diameter dimension on the other side in the axial direction that is smaller than or equal to a diameter dimension on the one side in the axial direction, the front edge portion and the rear edge portion of the plurality of second blades have a diameter dimension on the other side in the axial direction that is smaller than or equal to a diameter dimension on the one side in the axial direction, the separation plate inner diameter of the separation plate is larger than or equal to the main plate outer diameter, larger than or equal to the second front edge diameter, and smaller than or equal to the first front edge diameter, and the separation plate outer diameter of the separation plate is smaller than or equal to the side plate inner diameter, larger than or equal to the second rear edge diameter, and smaller than or equal to the first rear edge diameter.

2. The centrifugal fan according to claim 1, wherein
the inner diameter of the front edge portion of the plurality of second blades decreases from the one side toward the other side in the axial direction, and
the inner diameter of the front edge portion of the plurality of second blades at the other side end in the axial direction is smaller than the main plate outer diameter.

3. The centrifugal fan according to claim 1, wherein
an inclination angle of an inner peripheral edge portion of the plurality of second blades on a meridian plane with respect to the fan axis is defined as a meridian angle,
an inclination angle of a normal vector of the main plate with respect to the fan axis is defined as a main plate normal angle, and
the plurality of second blades are set such that the meridian angle is within a range from the main plate normal angle to an angle perpendicular to the fan axis.

4. The centrifugal fan according to claim 1, wherein the plurality of second blades are configured such that the second rear edge diameter is the same as the first rear edge diameter.

5. The centrifugal fan according to claim 1, wherein
the rear edge portion of the plurality of second blades is shifted in a circumferential direction of the fan axis in position with respect to the rear edge portion of the plurality of first blades.

6. A centrifugal blower comprising:
a centrifugal fan configured to draw in air from one side in an axial direction and blow out air outward in a radial direction;
a fan casing that houses the centrifugal fan and having a suction port formed on one side of the centrifugal fan in the axial direction through which air sucked into the centrifugal fan passes; and
a separation cylinder including a tubular portion arranged inside the centrifugal fan in the radial direction to separate the air passing through the suction port between an inner air flowing inside the tubular portion and an outer air flowing outside the tubular portion, wherein
the centrifugal fan comprising:
a plurality of first blades arranged around a fan axis;
a plurality of second blades arranged around the fan axis and located on the other side of the plurality of first blades in the axial direction;
a side plate formed in a ring shape around the fan axis to support a part of the plurality of first blades located on the one side in the axial direction;
a main plate that supports a part of the plurality of second blades located on the other side in the axial direction; and
a separation plate connecting the plurality of first blades to the plurality of second blades to suppress mixing of air flowing through a first blade passage formed between the plurality of first blades and air flowing through a second blade passage formed between the plurality of second blades, wherein
the plurality of first blades and the plurality of second blades are connected to each other via the separation plate without a direct contact,
a front edge portion of the plurality of first blades has a first front edge diameter which is a smallest inner diameter dimension in the front edge portion of the plurality of first blades,
a rear edge portion of the plurality of first blades has a first rear edge diameter which is a smallest outer diameter dimension in the rear edge portion of the plurality of first blades,
a front edge portion of the plurality of second blades has a second front edge diameter which is a largest inner diameter dimension in the front edge portion of the plurality of second blades, a rear edge portion of the plurality of second blades has a second rear edge diameter which is a largest outer diameter dimension in the rear edge portion of the plurality of second blades, the side plate has a side plate inner diameter which is a smallest inner diameter dimension in the side plate, the main plate has a main plate outer diameter which is a largest outer diameter dimension in the main plate, the separation plate has a separation plate inner diameter which is a smallest inner diameter dimension in the separation plate, the separation plate has a separation plate outer diameter which is a largest outer diameter dimension in the separation plate, the front edge portion and the rear edge portion of the plurality of first blades have a diameter dimension on the other side in the axial direction that is smaller than or equal to a diameter dimension on the one side in the axial direction, the front edge portion and the rear edge portion of the plurality of second blades have a diameter dimension on the other side in the axial direction that is smaller than or equal to a diameter dimension on the one side in the axial direction, the separation plate inner diameter of the separation plate is larger than or equal to the main plate outer diameter, larger than or equal to the second front edge diameter, and smaller than or equal to the first front edge diameter, and the separation plate outer diameter of the separation plate is smaller than or equal to the side plate inner diameter, larger than or equal to the second rear edge diameter, and smaller than or equal to the first rear edge diameter.

* * * * *